United States Patent [19]
Larson et al.

[11] Patent Number: 5,387,083
[45] Date of Patent: Feb. 7, 1995

[54] HELICOPTER SERVOFLAP ACTUATOR HAVING MECHANICAL STOP AND OIL PUMP

[75] Inventors: Lowell V. L. Larson, Huntington Beach; Mark Trutanich, San Pedro, both of Calif.

[73] Assignee: AlliedSignal Inc., Morris Township, Morris County, N.J.

[21] Appl. No.: 993,872

[22] Filed: Dec. 23, 1992

[51] Int. Cl.⁶ ............................................. B64C 27/615
[52] U.S. Cl. ......................................................... 416/23
[58] Field of Search ...................................... 416/23, 24

[56] References Cited

U.S. PATENT DOCUMENTS

| | | |
|---|---|---|
| 2,403,092 | 7/1946 | Lear . |
| 2,455,866 | 12/1948 | Kaman .................. 416/24 |
| 2,624,531 | 1/1953 | Stalker .................. 416/24 |
| 2,625,997 | 1/1953 | Doak ..................... 416/24 |
| 3,132,719 | 5/1964 | Cole . |
| 3,608,672 | 9/1971 | Dameridge . |
| 4,000,664 | 1/1977 | Christensen . |
| 4,079,866 | 3/1978 | Asioli . |
| 5,004,073 | 4/1991 | Grimm . |
| 5,088,339 | 2/1992 | Lochmoeller . |

FOREIGN PATENT DOCUMENTS

84/00053 1/1984 WIPO ................... 416/23

*Primary Examiner*—Edward K. Look
*Assistant Examiner*—James A. Larson
*Attorney, Agent, or Firm*—Robert A. Walsh

[57] ABSTRACT

In a servoflap system for helicopters, angular positions of the helicopter's servoflaps are controlled by actuators located near the tips of the helicopter blades. Each actuator contains a pump for circulating a lubricant onto the actuator's gears when blade pitch is being changed. The pump is built into the actuator's mechanical stops.

17 Claims, 4 Drawing Sheets

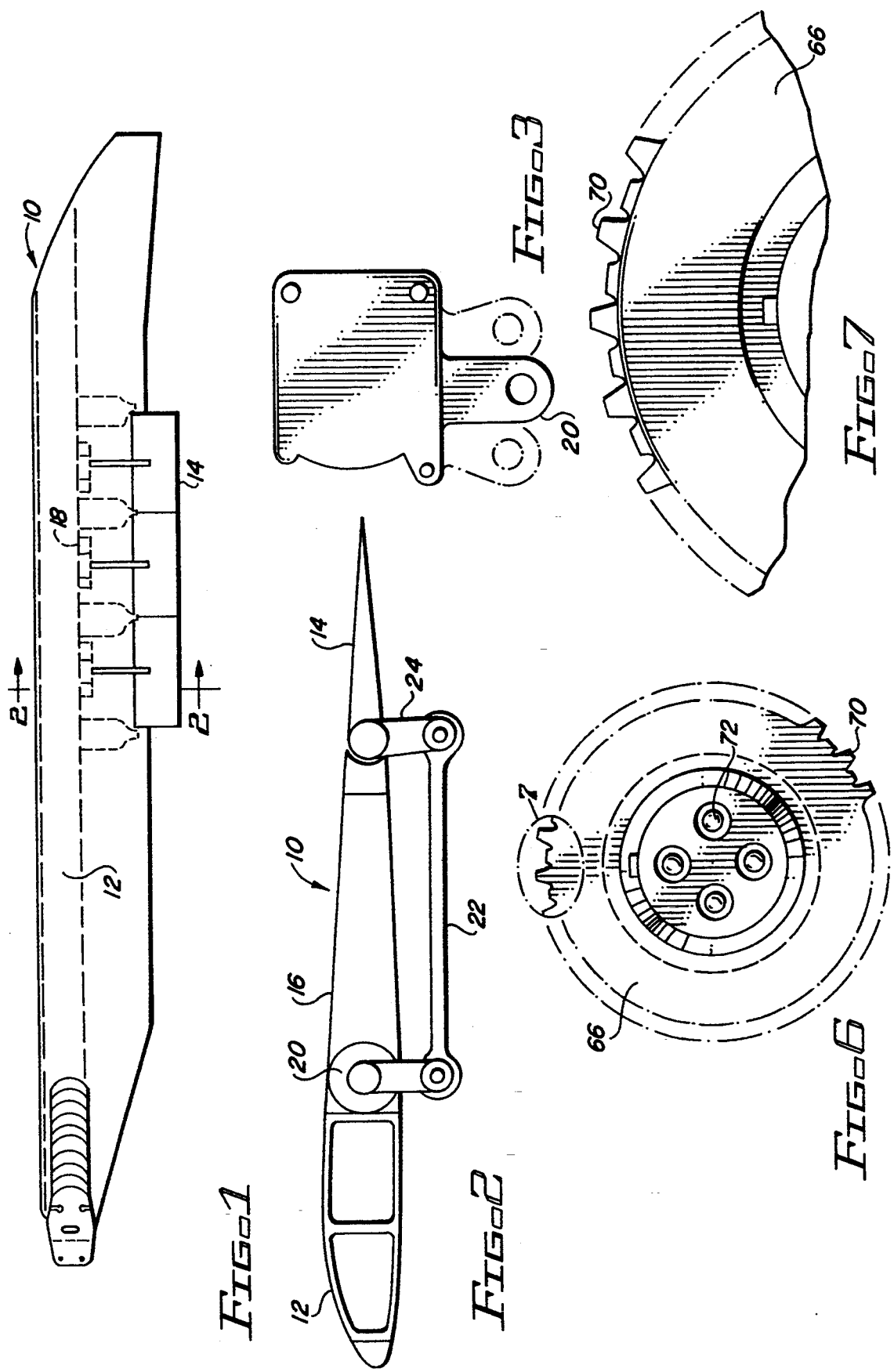

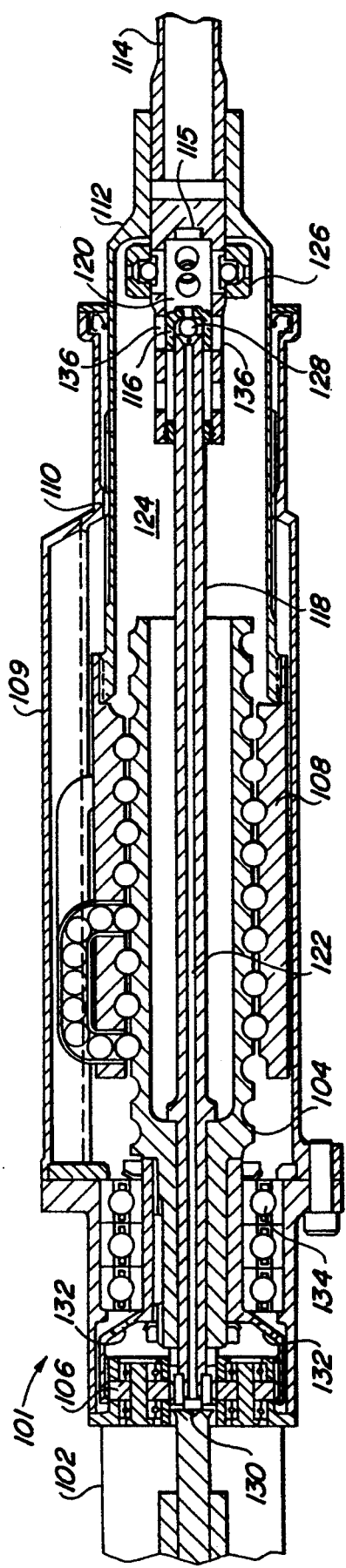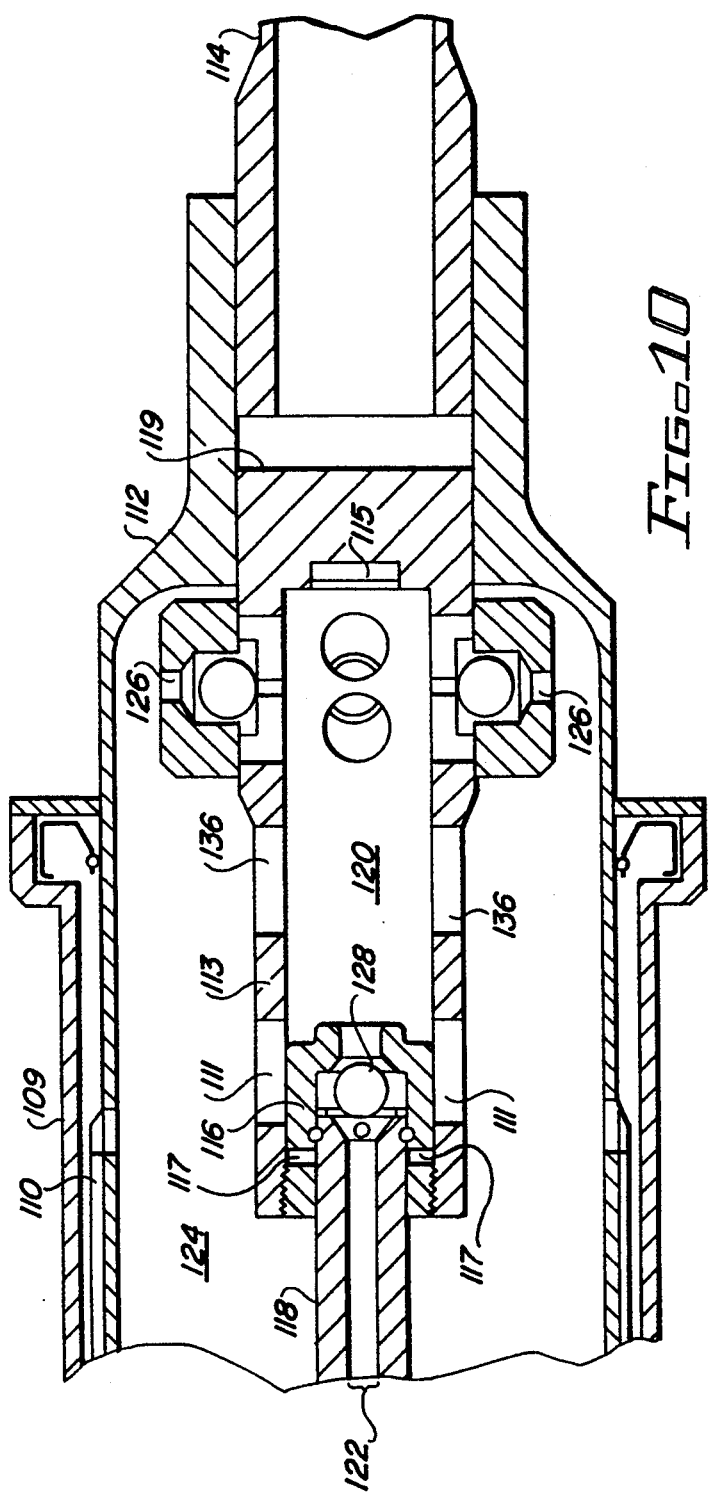

5,387,083

HELICOPTER SERVOFLAP ACTUATOR HAVING MECHANICAL STOP AND OIL PUMP

This invention was made with government support under contract No. DAAJ02-91-C-0044, awarded by DARPA. The government has certain rights in this invention.

BACKGROUND OF THE INVENTION

This invention relates in general to mechanical actuators and in particular to blade servoflap actuators for helicopters.

Helicopters offer many advantages over traditional fixed wing aircraft. Vertical rising capability allows the helicopter to operate in confined areas. Commercial operators use the helicopter for airport-to-city and interurban transportation, and the military uses it for transporting troops in and out of combat. Slow speed capability allows the helicopter to be used for forestry, pipeline and powerline patrols. Hovering capability allows the helicopter to be used as a rescue vehicle.

Vertical lift and forward propulsion are supplied by a rotor assembly whose mast is rotated about a vertical axis. The rotor is provided with a number of blades, designed as airfoils, which extend radially from the mast. When rotated in a horizontal plane by the mast, the blades accelerate air downward to provide a reactive lifting force, or they accelerate the air at an angle to provide lift and thrust. The direction in which the air is accelerated depends upon the pitch of the blades. Traditionally, blade pitch has been changed by hinging the roots of the blades to the rotor mast and twisting the blades about their longitudinal axes with a cyclic pitch changing device.

However blade pitch can also be changed by servoflaps located near the tips of the blades. In one servoflap system, the roots of compliant blades are rigidly attached to the rotor mast. Angular position of the servoflaps is changed by mechanical linkages extending through the blades and to the rotor mast. When the angular position of the servoflaps is changed, the air flowing thereover forces the blades to twist about their longitudinal axes, thereby changing blade pitch. This system was first disclosed by Charles Kaman in U.S. Pat. No. 2,455,866 issued on Dec. 7, 1948. This patent is incorporated herein by reference.

In another system, compliant blades are hinged at the mast in lead lag (back and forth) and flapping (up and down). As above, the change in angular position of the servoflaps causes blade pitch to change. Both systems provide smoother flight in practice.

It has been proposed to eliminate the mechanical linkages by mounting a rotary actuator at the tip of each blade. However, this arrangement is not feasible, particularly at high accelerations. At accelerations approaching 500 g's, lubrication is stripped away from the actuator's gearing, resulting in rapid wear and overheating of the actuator. High loads caused by rapid pitch changes further increase the wear and overheating

SUMMARY OF THE INVENTION

A helicopter servoflap system comprises at least one servoflap hinged to each helicopter blade near the blade tip, and at least one self-lubricating actuator for controlling the angular position of a corresponding servoflap. The actuators are located near the blade tips, thereby eliminating many of the mechanical linkages that would otherwise extend through the blades.

One type of actuator comprises an electric motor having an output shaft; gears, responsive to the output shaft, for reducing speed and increasing torque delivered by the electric motor; and a combination pump/stop. The pump/stop includes a pump shaft coupled for rotation by the motor shaft; piston means for translating along the pump shaft in response to rotation of the pump shaft; stop means for stopping the translation of the piston means; and a housing which cooperates with the stop means and piston means to form a chamber, The pump/stop also includes regulating means for regulating the flow of lubricant drawn into the chamber and pumped out of the chamber and onto said gears when the gears are being driven.

BRIEF DESCRIPTION OF TEE FIGURES

FIG. 1 is a top plan view of a helicopter blade employing a servoflap system according to the present invention;

FIG. 2 is a cross-sectional view taken along lines 2—2 of the helicopter blade of FIG. 1;

FIG. 3 depicts the range of movement of a bellcrank which forms a part of the servoflap system of FIG. 1;

FIG. 6 is an end view of the pump shown in FIG. 5;

FIG. 7 is a cross-sectional view taken along line 7—7 of the pump shown in FIG. 6;

FIG. 9 is an alternative embodiment of an electromechanical actuator according to the present invention; and FIG. 10 is an enlarged view of the pump shown in FIG. 9.

DETAILED DESCRIPTION OF THE INVENTION

Figure 4:
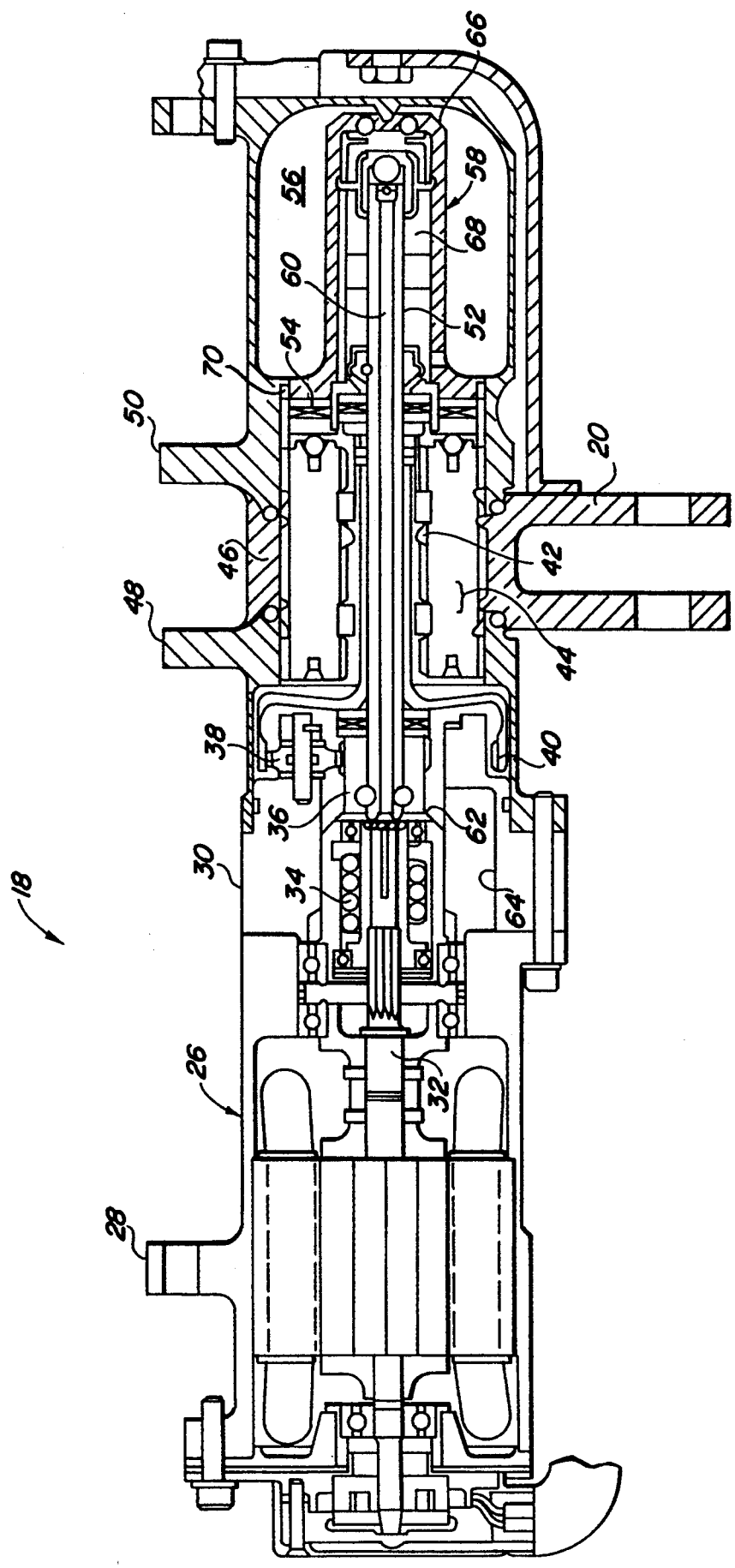
FIG. 4 is a cross-sectional view of an electromechanical actuator which forms a part of the servoflap system of FIG. 1.

FIGS. 1 and 2 show a helicopter blade 10 including a composite spar 12 and three servoflaps 14 at the blade tip. Two of these servoflaps 14 are provided for redundancy. The servoflaps 14 are hinged to the spar 12 by a flap support provision 16. Angular position of each servoflap 14 is controlled by a rotary actuator 18 located near the blade tip. The output of the rotary actuator 18 is a bellcrank 20 whose range of angular motion is limited to about forty degrees (see FIG. 3). A mechanical link 22 connects the actuator bellcrank 20 to a bellcrank 24 on the servoflap 14.

Referring now to FIG. 4, the rotary actuator 18 which is attached to piston housing 113 includes a brushless dc motor 26. Through a lug 28, the motor 26 is secured to a stationary structure such as the spar 12. Bolted onto the shaft end of the motor 26 is a carrier housing 30. The shaft 32 of the electric motor 26 extends into the carrier housing 30 where it drives reduction gears through a slip clutch 34. The reduction gears reduce motor speed while increasing torque transmitted by the motor 26. Increased torque enables the motor shaft 32 to rotate the bellcrank 20, which is loaded by its servoflap 14.

The reduction gears include a simple planetary set whose sun gear 36 is formed by the outer housing of the slip clutch 34. The sun gear 36 drives planets 38 whose axes are stationary. The planets 38, in turn, drive a ring gear 40. The simple planetary set then drives a compound planetary set. The sun gear 42 of the compound planetary set is pinned to the ring gear 40 of the simple planetary set. The compound sun gear 42 drives compound planets 44 which, in turn, drive a center ring gear housing 46. Flanking the center ring gear housing 46 are first and second ring gear housings 48 and 50 which are secured together and do not rotate. The center ring gear housing 46 is attached to the bell crank 20. The compound planetary set is employed when the envelope is small and high torque is required. For larger envelopes and/or lower torques, the compound planetary set would not be required and less expensive gearing, such as a simple planetary set or offset gears, would suffice.

Through the slip clutch 34, the motor 26 also rotates a pump tube 52, journalled to the carrier housing 30 by thrust needle bearings 54. The pump tube 52 extends into the second ring housing 50, which contains a reservoir 56 of liquid lubricant such as oil.

Attached to the end of the pump tube 52 within the reservoir 56 is a positive displacement pump 58. The pump 58 circulates the lubricant from the reservoir 56, through a bore 60 in the pump tube 52, through radial holes 62 and onto a pan 64. When the blade 10 and actuator 18 are rotated about the helicopter's rotor mast, g-forces cause the lubricant to flow off the pan 64, onto the reduction gears, and back to the reservoir 56. The lubricant performs two functions: it lubricates the reduction gears, and it transfers heat away from the gears. Heat is transferred from the reservoir 56 to the outside environment by convection.

The pump 58 includes a pump housing 66 whose outer surface cooperates with the second ring gear housing 50 to define the reservoir 56 and whose inner surface partly defines a chamber 68. The pump housing 66 is attached to the second ring gear housing 50 by splines 70, several of which are broken away to create return passageways for the lubricant to flow from the pan 64 to the reservoir 56 (see FIG. 7).

Figure 5:
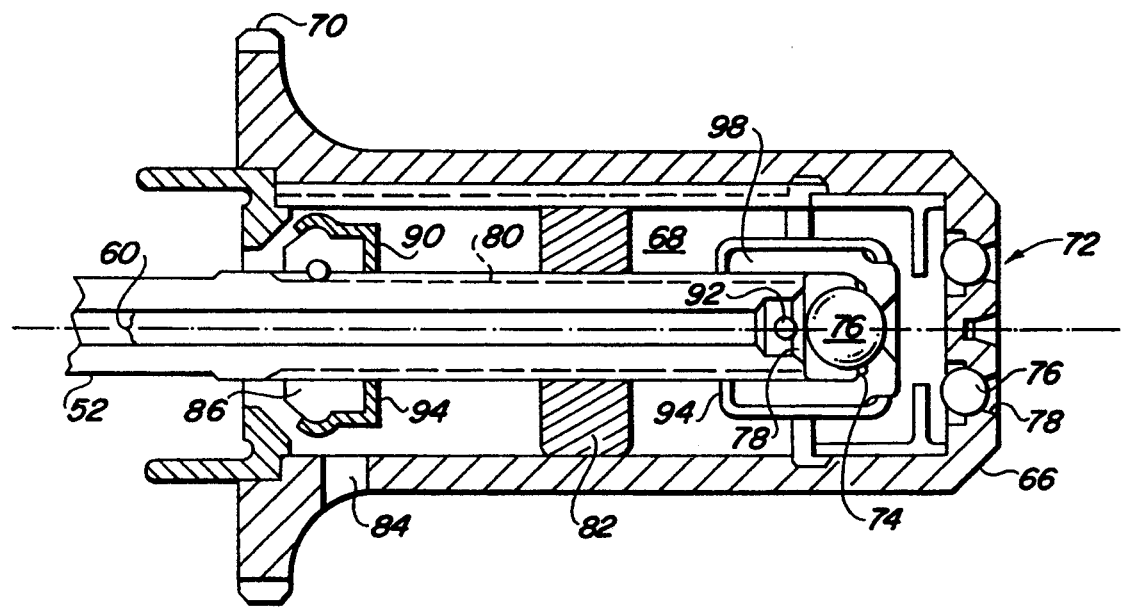
FIG. 5 is an enlarged view of a pump which forms a part of the actuator shown in FIG. 4.

FIGS. 5 and 6 show the pump 58 in greater detail. The input check valves 72 regulate the flow of lubricant from the reservoir 56 into the chamber 68, and output check valve 74 regulates the flow of lubricant from the chamber 68 into the bore 60 of the pump tube 52. Each check valve 72 and 74 consists of a ball 76 and a seat 78, configured to prevent reverse flows.

External threads 80 at the end of the pump tube 52 engage the internal threads of a piston 82. The piston 82 is keyed to the pump housing 66 to prevent rotation but to allow axial movement along the pump tube 52 as the pump tube 52 is rotated by the motor 26. As the piston 82 expands the volume of the chamber (the "expansion" stroke), the ball 76 of the input check valves 72 are unseated and the ball 76 of the output check valve 74 is seated. With the input check valves 72 opened and the output check valve 74 closed, the piston 82 draws lubricant into the chamber 68.

As the piston 82 reduces the volume of the chamber 68 (the "compression" stroke), the first check valves 72 are closed and the second check valve 74 is opened. As a result, lubricant is forced from the chamber 68, through the bore 60 and radial holes 62, and onto the reduction gears.

Labrynth grooves (not shown) circumscribe the piston 82 to slow the motion of lubricant leaking around the piston 82. Instead of labrynth grooves, piston seals can be employed. An aperture 84 in the pump housing 66 allows lubricant that has leaked past the piston 82 to return to the reservoir 56.

First and second stops 86 and 88 are secured to the pump tube 52 to limit the stroke of the piston 82. The second stop 88 helps define the chamber 68. Both stops 86 and 88 are internally threaded to engage the external threads 80 of the pump shaft 52. Once the stops 86 and 88 are positioned on the pump shaft 52 to set a 40° output stroke, pins 90 and 92 are inserted to lock the stops 86 and 88 in place. Retainers 94 snap over the stops 86 and 88 to retain the pins 90 and 92.

The pin 92 for the second stop 88 serves another function: it prevents the ball 76 from entirely sealing off the bore 60. By extending into the seat 78, the pin 92 contacts the ball 76 before its seals the bore 60.

The primary function of the stops 86 and 88, however, is to limit the motion of the bellcrank 20. As the motor 26 rotates the pump tube 52, the piston 82 translates between the stops 86 and 88. Whenever the piston 82 abuts against either stop 86 or 88, the motor shaft 32 stops rotating and the bellcrank 20 stops moving.

The slip clutch 34 protects the reduction gears from high torques caused by accidental overtravel. Rather than employing the slip clutch 34, the reduction gears can be made strong enough to withstand the shock, or the pump tube 52 can be made compliant.

The actuator 18 is preferably fabricated from a material such as steel. Steel is easy to fabricate, and it allows for robust operations such as servoflap control. For less robust operations, however, the pump 58 can be fabricated from a materials such as thermoplastic, aluminum, titanium or bronze.

Figure 8:
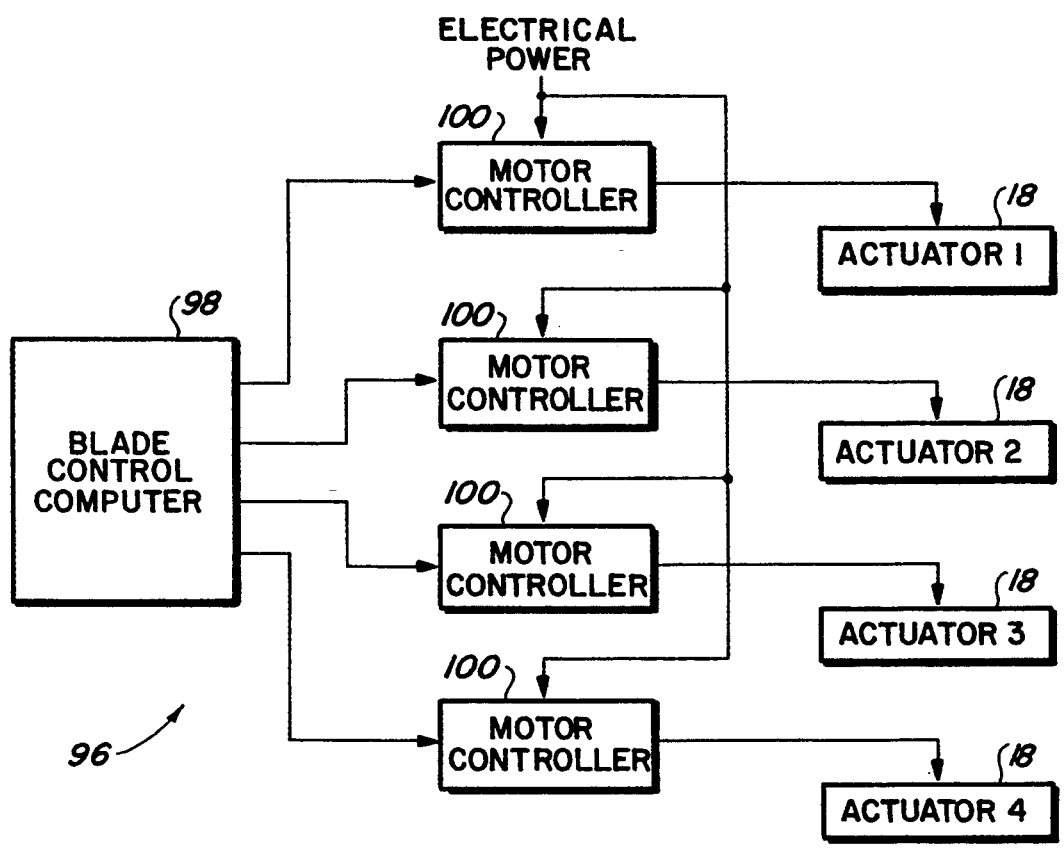
FIG. 8 is a schematic diagram of an electronic control system for the servoflap system of FIG. 1.

FIG. 8 shows an electronic control system 96 for controlling the servoflaps 14. Shown is only one channel for controlling one set of servoflaps 14. However, there are two other channels for the other two servoflaps on each blade 10, making for a triple redundant system 96.

For each channel there is a flight control computer (not shown) and a blade control computer 98. The flight control computer communicates with the blade control computer 98 in the rotating frame of reference via an optical data link. The blade control computer 98 communicates with a motor controller 100 for each blade. Each motor controller 100 commutates current in the stator windings of its motor 26 whenever the servoflap pitch must be changed. Blade control computers 98 and motor controllers 100 are well known to those skilled in the art.

FIGS. 9 and 10 show a linear actuator 101 whose motor 102 drives a ballscrew turning screw 104 through a simple planetary gear set 106 to reduce speed and increase torque. As the ballscrew turning screw 104 is turned, a ballscrew nut 108 oscillates. Splines 110 restrain the ballscrew nut 108 from turning with the screw 104 within the outer housing 109. The ballscrew nut 108 is secured to a pump housing 112 which is secured to a push-pull rod 114. The push-pull rod 114, in turn, is linked to a servoflap. To change angular position of the servoflaps, the ballscrew turning screw 104 is turned, causing the ballscrew nut 108, pump housing 112 and push-pull rod 114 to oscillate together. A snubber 115 acts as a stop means to dampen the impact of the end stroke.

A piston 116 is attached to the end of a pump tube 118, which is fixed to the ballscrew turning screw 104. The piston housing 113 is a hollow tubular construction fixedly mounted on pump housing 112, said piston housing 112 and piston 116 cooperate to form a chamber 120. A bore 122 extending through the pump tube 118 places the chamber 120 in fluid communication with the gear set 106.

Although the rotation of the ballscrew turning screw 104 causes the pump housing 112 to oscillate within the outer housing 109, the piston 116 remains stationary. Resulting is a relative motion between the piston 116 and pump housing 112 which is attached to piston housing 113, causing the volume of the chamber 120 to expand (the "expansion stroke") and contract (the "compression stroke"). During the expansion stroke, the piston 116 draws lubricant from a reservoir 124, through input check valves 126 as well as hole 136 in the side wall of piston housing 113, while lubricant is forced out vent hole 111 by the relative translation of piston 116 and into the chamber 120. The end of the expansion stroke is restricted by a hydraulic snubber means 17 which is a confined volume of lubricant. During the compression stroke, the piston 116 forces the lubricant through an output check valve 128, through the pump tube 118, through radial holes 130 and onto the gear set 106. The end of the compression stroke is restricted by hydraulic stop means 115 which is a confined volume of lubricant forced between end block 119 and piston 116. G-forces cause the lubricant to flow through the gear set 106, through portholes 132, onto bearings 134, through the turning screw 104 and ballscrew nut 108 and back to the reservoir 124. Because the ballscrew is very efficient it generates little heat and, therefore, consumes little lubricant. As with the rotary actuator 18, the linear actuator 101 lubricates its gears when angular position of the servoflap is being changed. A midway port 136 allows lubricant to quickly enter the chamber 120 from the reservoir 124. Thus, the pumping action takes place during half of the compression stroke.

Thus disclosed is a helicopter servoflap system wherein the actuator 18 (101) for each servoflap 14 is located at the helicopter's blade tip. Such location is made possible by a pump which circulates a liquid lubricant onto the actuator's reduction gears. The lubricant serves the dual function of lubricating the gears and removing heat therefrom. Because the pump utilizes the actuator's hydraulic stop means 117 and 115, it is designed into the actuator 18 (101) without consuming additional space.

The actuators 18 and 101 may be used in any environment where a constant acceleration (e.g., gravity) exists. The high acceleration environment encountered at helicopter blade tips offers but one environment for the actuators 18 and 101.

It will be understood that the embodiments described herein are merely exemplary and that a person skilled in the art may make modifications and variations without departing from the spirit and scope of the invention. All such modifications and variations are intended to be included within the scope of the invention as defined in the appended claims.

What is claimed is:

1. A servoflap system for a helicopter blade, comprising:
    at least one servoflap;
    hinging means for hinging said at least one servoflap to said blade near said blade's tip; and
    at least one self-lubricating actuator, located near said blade tip, for controlling the angular position of said at least one servoflap.

2. The system of claim 1, wherein each said actuator includes:
    a motor having an output shaft;
    gear means, responsive to said output shaft, for reducing speed and increasing torque delivered by said motor;
    linkage means for linking an output of said gear means to a corresponding servoflap; and
    means for lubricating said gear means when said angular position of said at least one servoflap is being changed.

3. The system of claim 2, wherein said gear means are reduction gears.

4. The system of claim 2, wherein said lubricating means includes:
    a reservoir of liquid lubricant that is located outboard of said gear means;
    pump means for pumping said lubricant from said reservoir onto said gear means; and
    a return passageway in fluid communication with said pump means and said reservoir, whereby centrifugal force causes said lubricant flowing from said pump means to pass through said gear means and return to said reservoir through said return passageway.

5. The system of claim 4, wherein rotation of said motor shaft causes rotation of said gear means output, and wherein said pump means also functions to limit the rotation of said gear means output.

6. The system of claim 5, wherein said pump means includes:
    a pump shaft coupled for rotation with said motor shaft;
    piston means for translating along said pump shaft in response to rotation of said pump shaft;
    stop means, coupled to said pump shaft, for stopping said translation of said piston means;
    a pump housing which cooperates with said stop means and said piston means to define a chamber; and
    regulating means for regulating flow of said lubricant drawn into said chamber from said reservoir and pumped out of said chamber onto said gear means.

7. The system of claim 6, wherein said pump shaft has an internal bore in fluid communication with said return passageway; wherein said chamber is in fluid communication with said reservoir via a first passageway and said chamber is in fluid communication with said bore via a second passageway; and wherein said regulating means includes:
    first valve means, disposed within said first passageway, for regulating the flow of lubricant drawn into said chamber from said reservoir; and
    second valve means, disposed within said second passageway, for regulating the flow of lubricant pumped from said chamber into said bore.

8. The system of claim 7, wherein said first and second valve means include check valves that are configured to prevent reverse flows.

9. The system of claim 8, wherein said piston means opens said first valve and closes said second valve when it expands the volume of said chamber, whereby lubricant is drawn into said chamber from said reservoir; and wherein said piston means closes said first valve and opens said second valve when it contracts said volume of said chamber, whereby lubricant is pumped out of said chamber and into said bore.

10. The system of claim 6, further comprising slip clutch means for coupling said motor shaft to an input of said gear means and for coupling said motor shaft to said pump shaft.

11. The system of claim 6, further including:
a first housing for housing said gear means;
a second housing which is secured to said first housing and which contains said pump housing, an outer surface of said pump housing and an inner surface of said second housing defining said reservoir; and
means for splining said pump housing to said second housing; at least one of said spline means being removed to form said return passageway.

12. The system of claim 4, wherein said linkage means includes a ballscrew turning screw that is responsive to said gear means output, a ballscrew nut which engages said turning screw; and a push rod having a first end coupled to said servo flap; and wherein said pump means includes:
a pump housing which couples said ballscrew nut to a second end of said push rod, whereby rotation of said turning screw causes translation of said ballscrew nut, said pump housing and said push rod;
a pump tube which is fixed to said turning screw and which has a first end extending into a piston housing;
piston means, affixed to said first end of said pump tube, said piston housing, an end portion of said piston housing, and said piston means cooperating to define a chamber;
stop means for stopping said translation of said pump housing when the piston means approaches the end portion of the piston housing, and
regulating means for regulating flow of said lubricant drawn into said chamber from said reservoir and pumped out of said chamber onto said gear means.

13. The system of claim 12, wherein said pump tube has an internal bore in fluid communication with said return passageway; wherein said chamber is in fluid communication with said reservoir via a first passageway and said chamber is in fluid communication with said bore via a second passageway; and wherein said regulating means includes:
first valve means, disposed within said first passageway, for regulating the flow of lubricant drawn into said chamber from said reservoir; and
second valve means, disposed within said second passageway, for regulating the flow of lubricant pumped from said chamber into said bore.

14. The system of claim 13, wherein said first and second valve means include check valves that are configured to prevent reverse flows.

15. The system of claim 14, wherein said first valve is opened and said second valve is closed when the volume of said chamber is expanded, whereby lubricant is drawn into said chamber from said reservoir; and wherein said first valve is closed and said second valve is opened when said volume of said chamber is contracted, whereby lubricant is pumped out of said chamber and into said bore.

16. The system of claim 12, further including:
a first housing which partially contains said turning screw, and contains said piston housing, said reservoir formed at an outboard end of said first housing; and
a second housing, secured to said first housing, for containing said gear means, said second housing being provided with portholes which allows lubricant pumped onto said gear means to flow from said gear means, over said turning screw and said ballscrew nut, and back to said reservoir.

17. The system of claim 12, wherein said piston housing includes a midway port which places said chamber in fluid communication with said reservoir.

* * * * *